(12) United States Patent
Chiang et al.

(10) Patent No.: US 10,356,017 B2
(45) Date of Patent: Jul. 16, 2019

(54) CONFIGURABLE USE OF LOCAL PRESENCE AUTHORIZATION POLICY

(71) Applicant: T-Mobile USA, Inc., Bellevue, WA (US)

(72) Inventors: Hsin-Fu Henry Chiang, Bellevue, WA (US); Miles Raymond, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 422 days.

(21) Appl. No.: 14/968,641

(22) Filed: Dec. 14, 2015

(65) Prior Publication Data

US 2017/0171120 A1    Jun. 15, 2017

(51) Int. Cl.

| | |
|---|---|
| *G06F 15/16* | (2006.01) |
| *H04L 12/58* | (2006.01) |
| *H04W 12/08* | (2009.01) |
| *H04L 29/06* | (2006.01) |
| *H04L 29/08* | (2006.01) |

(52) U.S. Cl.
CPC ........ *H04L 51/043* (2013.01); *H04L 65/1016* (2013.01); *H04L 67/24* (2013.01); *H04W 12/08* (2013.01)

(58) Field of Classification Search
CPC ..... H04L 67/24; H04L 51/043; H04L 63/102; H04L 63/0227; H04L 63/08; H04L 63/10; H04L 63/104; H04L 65/1016; H04L 67/306; H04L 65/1006; H04L 63/105;
(Continued)

(56) References Cited

U.S. PATENT DOCUMENTS

| | | | |
|---|---|---|---|
| 2007/0124294 A1* | 5/2007 | Sun ......................... | H04L 67/24 |
| 2007/0214243 A1* | 9/2007 | Bao ......................... | H04L 67/24 |
| | | | 709/220 |

(Continued)

FOREIGN PATENT DOCUMENTS

KR    1020130040822 A    4/2013

OTHER PUBLICATIONS

PCT Search Report and Written Opinion dated Mar. 16, 2017 for PCT Application No. PCT/US16/64981, 14 pages.

(Continued)

*Primary Examiner* — Dustin Nguyen
*Assistant Examiner* — Hao H Nguyen
(74) *Attorney, Agent, or Firm* — Lee & Hayes, P.C.

(57) ABSTRACT

A request from a watcher client to obtain presence information of a presentity client may be processed at a presence server using a system configuration of the presence server that stores local presence authorization rules ("pres-rules"). By storing pres-rules locally at the presence server, these pres-rules may be used by the presence server in lieu of, or in combination with, other pres-rules that may be maintained by a separate pres-rules storage server, such as an eXtensible Markup Language (XML) Document Management Server (XDMS). The system configuration may specify configurable parameters that control the behavior of the presence server in engaging the XDMS when processing requests from watcher clients, as well as the behavior of the presence server in merging pres-rules retrieved from the XDMS with the local pres-rules maintained by the presence server.

20 Claims, 5 Drawing Sheets

(58) Field of Classification Search
CPC ..... H04L 67/22; H04L 67/42; H04L 41/0803; H04M 2203/6009; H04W 12/08
USPC ....... 709/203, 206, 217, 219, 220, 224, 225; 726/1, 4, 21, 28; 713/168, 169
See application file for complete search history.

(56) References Cited

U.S. PATENT DOCUMENTS

| | | | | |
|---|---|---|---|---|
| 2008/0068371 | A1* | 3/2008 | Sun | H04L 63/10 345/418 |
| 2008/0092233 | A1* | 4/2008 | Tian | H04L 63/0227 726/21 |
| 2009/0307349 | A1* | 12/2009 | Harris | H04L 67/24 709/224 |
| 2009/0320094 | A1* | 12/2009 | Kiss | H04L 67/26 726/1 |
| 2010/0281109 | A1* | 11/2010 | Lassborn | H04M 7/0093 709/203 |
| 2010/0311409 | A1* | 12/2010 | Dostal | H04W 4/023 455/422.1 |
| 2011/0055369 | A1* | 3/2011 | Oh | H04L 67/24 709/224 |
| 2011/0131629 | A1 | 6/2011 | Oh et al. | |
| 2011/0289195 | A1* | 11/2011 | Lindgren | H04L 67/24 709/219 |
| 2012/0096123 | A1* | 4/2012 | Klein | H04L 67/24 709/219 |
| 2012/0304252 | A1* | 11/2012 | Boberg | H04L 63/105 726/1 |
| 2013/0024949 | A1* | 1/2013 | Baldwin | H04L 63/10 726/28 |

OTHER PUBLICATIONS

The Extended European Search Report dated May 31, 2019 for European Patent Application No. 16876388.6, 10 pages.

* cited by examiner

CONFIGURABLE USE OF LOCAL PRESENCE AUTHORIZATION POLICY

BACKGROUND

Rich Communications Services (RCS) is a platform that enables delivery of communication experiences to users beyond voice and short message service (SMS) text, such as instant messaging or chat, live video calling, file sharing, and so on. An enabling technology of RCS has been the transition from legacy circuit-switched network technology to packet-switched network technology based on Internet Protocol (IP), such as the packet-switched network provided by the IP Multimedia Subsystem (IMS). Today's RCS platform also provides a presence service that allows users with RCS-capable communication devices to share presence information with other users of the network. The RCS presence service is implemented according to the specifications defined by the Open Mobile Alliance (OMA), such as OMA SIMPLE Presence Technical Specification (TS) 2.0 and the OMA SIMPLE Presence eXtensible Markup Language (XML) Document Management (XDM) TS 2.0.

According to these OMA specifications, in order to utilize the RCS presence service, a first user's client device provides presence information to a presence server, which stores the presence information in association with the first user, often referred to as a "presentity." Thereafter, the presence information of the presentity can be made available to other users that request this presence information, these requesting users often referred to as "watchers." However, in order to authorize sharing of presence information with watchers, the OMA specifications call for the client device of a presentity to provide explicit permission to the IMS network to share its capabilities with watchers. Today, this is accomplished by the presentity client transmitting an XML document containing "presence authorization rules" (abbreviated herein as "pres-rules") to a storage server called an XML Document Management Server (XDMS). The XDMS stores an XML document for each presentity that publishes presence information to the presence server of the IMS network. Thereafter, the presence server may retrieve pres-rules from the XDMS, as needed, in order to process requests for presence information received from watchers.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques and systems for processing requests for presence information using a system configuration that is maintained at a presence server of a network that supports presence services. In some implementations, the system configuration controls the presence server regarding the presence server's use of presence authorization rules for processing presence information requests. "Presence authorization rules" are often abbreviated herein as "pres-rules," and are sometimes referred to herein as a "presence authorization policy." The presence server can store local pres-rules that are usable for processing presence information requests. By storing pres-rules locally at the presence server, the locally stored pres-rules may, in some implementations, be used by the presence server in lieu of other pres-rules maintained by a separate pres-rules storage server, such as an XDMS. That is, the system configuration of the presence server can be used to control the presence server by instructing the presence server to use the local pres-rules as a default authorization policy without engaging the XDMS. In this manner, the act of publishing presence information by a presentity client is interpreted by the presence server as implicit permission to share the presentity's presence information with watcher clients according to the local pres-rules maintained by the presence server.

Using the local pres-rules as a default authorization policy means that the XDMS can be removed from the network topology, although this is an optional implementation, as described in more detail herein. By removing the XDMS and globally applying the local pres-rules to requests for presence information as a default authorization policy, a reduction in network traffic (bandwidth usage) may be realized, which results in network optimization by cutting out unneeded network traffic to and from the XDMS. Accordingly, the local pres-rules maintained by the presence server are sometimes referred to herein as "global pres-rules," meaning that the local pres-rules can be globally applied to requests for presence information depending on the system configuration settings.

Although the system configuration may specify that the local pres-rules are to be utilized as an overriding default authorization policy, the system configuration of the presence server is configurable (e.g., by setting one or more parameter values specified in the system configuration) to control the behavior of the presence server in determining whether to engage a separate storage server, such as an XDMS, for retrieval of pres-rules maintained by the XDMS. For example, the XDMS may receive and maintain customized pres-rules from client devices for later retrieval by the presence server so that the customized pres-rules from the XDMS can be used either in lieu of the local pres-rules maintained by the presence server, or in conjunction with the local pres-rules (e.g., by merging the customized pres-rules with the local pres-rules to create composite pres-rules). These customized pres-rules can be used whenever the presence server is able to retrieve them from the XDMS.

In the event of a failure to successfully retrieve the customized pres-rules from the XDMS, however, the system configuration can control the presence server to use the local pres-rules maintained by the presence server as a fallback mechanism to ensure presence service availability throughout an XDMS service interruption, or to provide presence service in the event that a presentity client fails to explicitly provision customized pres-rules to the XDMS (e.g., when a presentity client is not XDMS-capable). This is an improvement over the current RCS framework because failure to retrieve pres-rules from the XDMS (e.g., during an XDMS service interruption) in the current RCS framework would result in a loss of presence service to users because the OMA specifications describes that all watchers are to be blocked from obtaining presence information when there is a failure to retrieve pres-rules from the XDMS. In the scenario of an XDMS service interruption where pres-rules for all presentities are inaccessible, nationwide outages of RCS services (e.g., chat, video calling, etc.) can occur, which provides poor customer experience with presence services.

Example Environment

Figure 1:
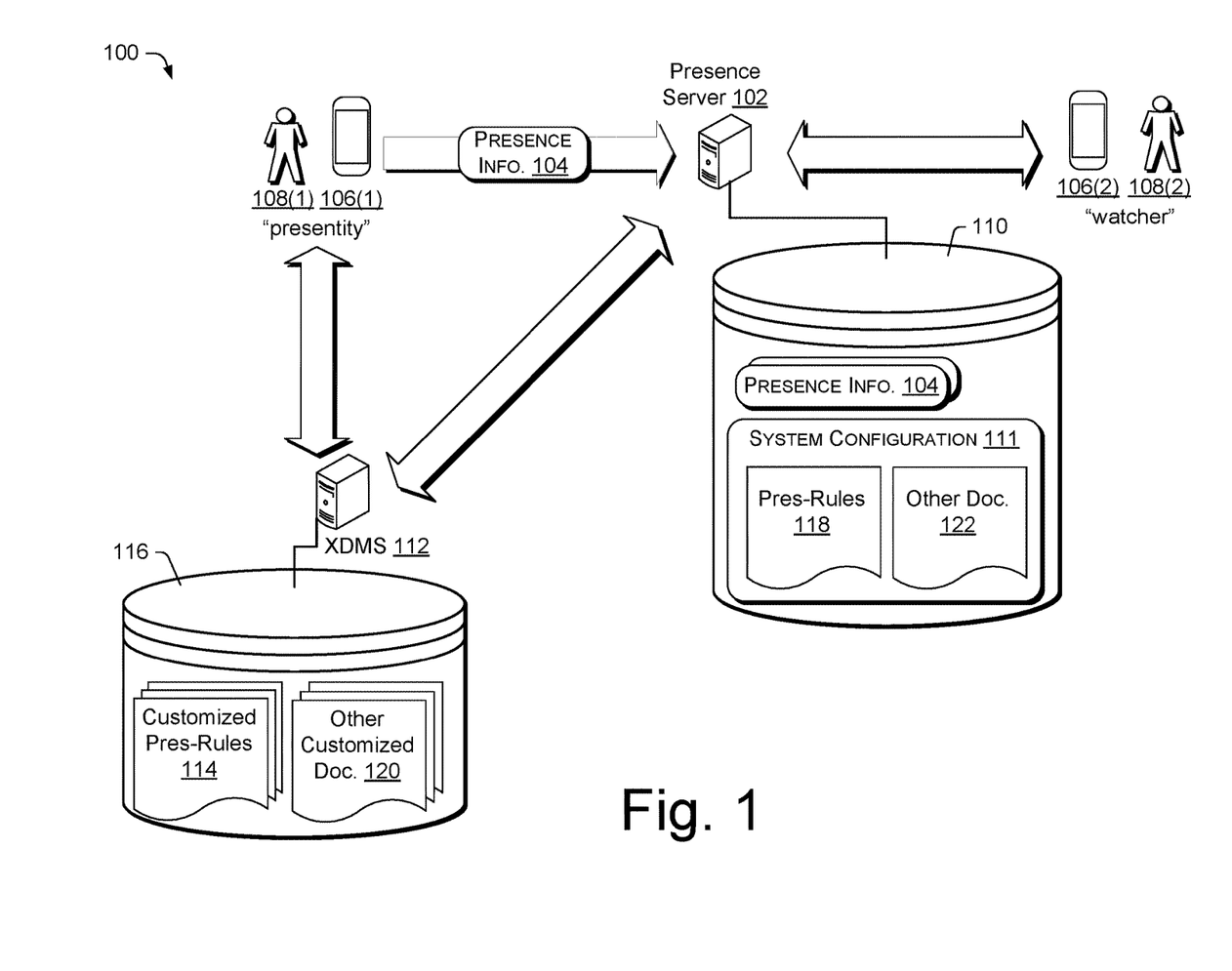
FIG. 1 illustrates an example network environment for utilizing a configurable presence authorization policy that is maintained by a presence server.

FIG. 1 illustrates an example network environment 100 for utilizing a system configuration of a presence server 102 to process requests for presence information. The network environment 100 may represent an IMS network that is based on Session Initiation Protocol (SIP), but the techniques and systems described herein are not limited to the IMS network topology, as any suitable computer network may benefit from the techniques and systems described herein.

A presence service may be implemented in the network environment 100 so that presence information 104 can be shared amongst users and devices of the network environment 100. To enable the implementation of such a presence service, client devices, such as the client devices 106(1) and 106(2) (collectively 106), can be RCS-capable clients that are configured to implement functionality for sharing presence information 104 and for subscribing to presence information 104 shared by other client devices 106. The client devices 106 described herein (sometimes referred to as "user equipment (UE)") may be implemented as any suitable communication devices configured to communicate over a wireless network, including, without limitation, a mobile phone (e.g., a smart phone), a tablet computer, a laptop computer, a desktop or personal computer (PC), a set-top-box (STB), a game console, a smart television, a portable digital assistant (PDA), a wearable computer (e.g., electronic/smart glasses, a smart watch, fitness trackers, etc.), a networked digital camera, and/or similar client devices. Furthermore, the client devices 106 may be capable of communicating over wired connections, and/or wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future IP-based network technology or evolution of an existing IP-based network technology.

In FIG. 1, the client device 106(1) may represent a presentity client that is associated with a user 108(1), called a presentity. As used herein, the term "presentity" may comprise a user, such as the user 108(1), or a client device, such as the client device 106(1). The client device 106(1) may enable the sharing of presence information 104 at the direction of the user 108(1), or the client device 106(1) may operate automatically on behalf of the user 108(1) to share presence information 104.

The presence information 104 may comprise any type of information related to a user, such as the user 108(1), and that can be published to the presence server 102. In one example, the presence information 104 comprises service capabilities of the client device 106(1), which conveys to other client devices 106 and users 108 the types of services that the client device 106(1) is capable of. For instance, service providers of the network environment 100, such as carriers of telecommunications services, may provide users with various IMS-based services, such as multimedia telephony (MMTel) services including voice, real-time video, chat, text, file transfer, and so on. It may be the case, however, that particular client devices, such as the client device 106(1), are capable of performing a subset of the available capabilities. In this manner, the presence information 104 may be a mechanism for the client device 106(1) to convey to other client devices 106 its ability to communicate via particular services provided by a service provider of the network environment 100.

In addition to service capabilities, the presence information 104 can include additional types of information related to the user 108(1), such as, without limitation, service availability information (e.g., whether the client device 106(1) is available to perform video calling), geolocation information, user availability information (e.g., the user 108(1) or client device 106(1) can set its availability to "busy," "available," "do not disturb," "away," "online," "offline," etc.), communication status, mood information (e.g., happy, sad, angry, etc.), device information (e.g., the user 108(1) may designate a phone for receiving voice calls, and a tablet for receiving video calls, etc.), contact information (e.g., phone numbers, electronic mail (e-mail) addresses, etc.), a custom icon or indicator (e.g., a graphical symbol that conveys meaning and corresponding text descriptions of the graphical symbol), and so on. One or more of these types of presence information 104 may convey an ability and/or a willingness of the user 108(1) and/or client device 106(1) to communicate with other users 108 and devices 106, such as a watcher client 106(2), so that the user 108(2) can choose whether he/she wants to interact with the presentity user 108(1). When the presence information 104 changes for a particular presentity, the presentity client 106(1) can publish the updated presence information 104 to the presence server 102, causing the presence server 102 to send a notification to any subscribing watcher clients 106. Presence information 104 can be updated in real-time based on SIP requests received at the presence server 102 from the client device 106(1), or by a polling mechanism implemented by the presence server 102.

The client device 106(1) can have RCS functionality such that, when the user 108(1) powers on the client device 106(1), the client device 106(1) informs the presence server 102 of its presence information 104. In the IMS context, this action may comprise sending a message using SIP, such as a SIP PUBLISH method. SIP is a signaling protocol that can be used to establish, modify, and terminate multimedia sessions over packet networks, and to authenticate access to IMS-based services, such as a presence service. SIP has been standardized by the Internet Engineering Task Force (IETF). A message in the form of a SIP request is a message that is sent from the client device 106 to the IMS core (e.g., the presence server 102) using SIP protocol. In this example, the client device 106(1) can send a SIP request comprising a SIP PUBLISH method to provide presence information 104 to the presence server 102. A SIP response is a message that is sent from the IMS core to the client device 106 using SIP protocol.

The presence server 102, upon receiving the presence information 104 from the client device 106(1), stores the presence information 104 in storage 110 that is local to the presence server 102. The local storage 110 can comprise any suitable data store or repository, such as a database of presence information 104 associated with a plurality of presentity clients. Thereafter, the client device 106(1) can save battery because the presence server 102 can answer other client devices 106 on behalf of the client device 106(1).

FIG. 1 further illustrates that the presence server 102 stores pres-rules 118a system configuration 111 that is usable by the presence server 102 for processing requests for presence information 104. The pres-rules 118 system configuration 111 can specify (e.g., in an XML document) one or more configurable parameters. These configurable parameters of the system configuration 111 can be set, by an authorized service provider, to particular values in order to control the behavior of the presence server 102 in determining whether to engage and interrogate a separate storage server, such as an XDMS 112, for retrieval of customized pres-rules 114 maintained in storage 116 of the XDMS 112. FIG. 1 illustrates that the XDMS 112 is located remotely from the presence server 102, such as the XDMS 112 being located at a different geolocation than the geolocation where the presence server 102 is located. In this scenario, the presence server 102 can communicate with, or otherwise transfer/receive data to/from the XDMS 112 over a wide area network (WAN). Alternatively, the XDMS 112 can be collocated with the presence server 102 at the same geolocation (e.g., within the same datacenter, server facility, etc.), or a geolocation in close proximity (e.g., the XDMS 112 can be close enough to communicate with, or otherwise transfer/receive data to/from the presence server 102 over a local area network (LAN)). In some implementations, the XDMS 112 and the presence server 102 can be on the same physical node, yet the XDMS 112 and the presence server 102 can remain separate as two different functional nodes communicatively coupled with one another.

The configurable nature of system configuration 111 allows a service provider of the network environment 100, such as a carrier of MMTel services, to configure the pres-rules 118 parameters of the system configuration 111 on-demand in order to implement various functions, features, and processes related to the sharing of presence information 104 amongst its customers (users 108). For example, the presence server 102 can store its own pres-rules 118 in the local storage 110 as an XML document within the system configuration 111. This allows a service provider to create a system configuration 111 pres-rules 118, and thereafter change or update the system configuration 111 pres-rules 118 on-demand so that the service provider can globally apply the pres-rules 118 maintained in local storage 110 of the presence server 102 to all users 108. The pres-rules 118, like the customized pres-rules 114 maintained by the XDMS 112, can specify which classes of watchers, or particular watchers, are allowed to discover (or are blocked from discovering) presence information 104 of presentities, such as the presentity client 106(1), as well as which types of presence information 104 can be distributed to authorized watchers. The pres-rules 118 can use any suitable authorization policy to authorize sharing of presence information 104, such as a blacklist, a whitelist, per-watcher designations, and so on. In this manner, the service provider can control, via configurable parameters of the system configuration 111, which presence information 104 can be distributed to which watchers, and when it can be distributed to such authorized watchers.

FIG. 1 shows that another user 108(2) with an associated client device 106(2) represents a watcher. The watcher client 106(2) may transmit, to the presence server 102, a request to obtain presence information 104 of the presentity client 106(1). This request from the watcher client 106(2) may comprise a one-time fetch for presence information 104, or a subscription request that allows the watcher client 106(2) to be continuously notified of any updated presence information 104 associated with the presentity client 106(1) for the duration of the subscription. For example, the watcher client 106(2) may transmit a message using SIP, such as a SIP SUBSCRIBE method, to the presence server 102 in order to subscribe to the presence information 104 of the presentity client 106(1). Furthermore, the request for presence information 104 can be initiated automatically by the watcher client 106(2) on behalf of the user 108(2), or at the direction of the user 108(2), such as in response to the user 108(2) looking up contact information for the user 108(1) on the client device 106(2).

Because the presentity client 106(1), in the example of FIG. 1, has already provided presence information 104 to the presence server 102, the presence server 102 can answer the watcher client 106(2), or otherwise process the request from the watcher client 106(2), on behalf of the presentity client 106(1). However, before processing the watcher's request, the presence server 102, pursuant to OMA specifications, is to first consult pres-rules that authorize sharing of the presence information 104 of the presentity client 106(1) with the watcher client 106(2). To do this, the presence server 102 can access the system configuration 111 from local storage 110 to identify a configurable parameter that tells the presence server 102 how to proceed with processing the request from the watcher client 106(2).

For example, a parameter may be specified in the system configuration 111 that controls the behavior of the presence server 102 in determining whether to engage the XDMS 112. This parameter can be referred to as "useLocalPresRules," and can be set to values of: (i) PRS_YES, (ii) PRS_NO, or (iii) PRS_MERGE. The names of the configurable parameter and the parameter values are not limiting and are used merely for exemplary purposes. When the "useLocalPresRules" parameter is set to the value PRS_YES, the presence server 102 may use the local pres-rules 118 as an overriding default authorization policy that is globally applied to all users 108 and devices 106. In this scenario, the XDMS 112 can be removed from the network topology of FIG. 1, and the request received from the watcher client 106(2) can be processed by using the locally stored pres-rules 118 in lieu of any pres-rules 114 at the XDMS 112. This reduces network traffic (bandwidth usage) as compared to current presence service implementations by omitting network traffic between the presence server 102 and the XDMS 112. Even in implementations where the XDMS 112 and the presence server 102 are on the same physical node, the presence server 102 no longer has to pass traffic to the other functional node (i.e., the XDMS 112), which reduces bandwidth usage and frees up the presence server 102 for communication with other nodes of the network.

When the pres-rules 118, or any pres-rules, are used to process a request from a watcher 108(2) to obtain presence information 104 of a presentity 108(1), the presence server 102 may grant or deny the request based on the pres-rules 118. If the pres-rules 118 indicate that the requesting watcher 108(2) is authorized to receive the presence information 104 of the presentity 108(1), the request may be granted, the presence information 104 may be retrieved from the local storage 110 of the presence server 102, and a notification including the presence information 104 of the presentity 108(1) may be sent to the requesting client device 106(2). This notification may be transmitted via a SIP NOTIFY method to the watcher client 106(2).

Using the local pres-rules 118 to process such watcher requests allows for simplifying client devices, such as the client device 106(1), because the client device 106 (in this implementation) does not have to provide pres-rules 114 to the XDMS 112. The XDMS 112 is an XML Configuration Access Protocol (XCAP) server that is configured to support management of XML documents 120. One example type of XML document is a pres-rules XML document 114 that contains the pres-rules 114 received from client devices 106 for retrieval by the presence server 102. Thus, a client device 106 configured to send customized pres-rules 114 to the XDMS 112 includes code to implement procedures using XCAP, such as authorization procedures. If the configurable pres-rules 118 can be used in lieu of the pres-rules 114 at the XDMS 112, this XCAP code flow can be removed from the client device 106(1), thereby simplifying the client device 106(1). In fact, in the current RCS framework, all RCS-capable client devices 106 are "SIMPLE" clients in the sense that the client devices 106 each provide the same pres-rules 114 to the XDMS 112. Storing multiple copies of the same XML document for numerous (e.g., millions of) client devices 106 is unnecessary with use of the techniques and systems described herein. By contrast, a single, local XML document containing the pres-rules 118 can be locally stored at the presence server 102, which conserves memory because the XDMS 112 no longer has to store an XML document containing pres-rules 114 for each user/client. This may result in significant savings in memory usage when client devices 106 on the order of millions of client devices 106 no longer have to provide an XML document 114 to the XDMS 112.

Although the examples described herein predominantly refer to XML documents containing presence authorization rules (pres-rules) 114, the techniques and systems described herein are not limited to implementations with XML documents that contain pres-rules 114. That is, the XDMS 112 can store other customized documents 120 that can be selectively retrieved by the presence server 102 and used in lieu of, or in combination with, a locally-stored XML document 122 (i.e., stored in the local storage 110 of the presence server 102) of the same type. For example, the other customized document 120 can represent a resource-list XML document (as defined in the OMA specifications) received from the presentity client 106(1), and the presence server 102 can selectively retrieve and utilize the resource-list XML document 120 maintained at the XDMS 112 in response to a subscription request from the watcher client 106(2) that is directed to the presentity client 106(1). Such a resource list contained in the resource-list XML document 120 can include a list of resources identified by uniform resource identifiers (URIs) to which subscription requests and other operations can be applied for a particular user (e.g., the presentity user 108(1)). In this manner, the XDMS 112 can store multiple resource-list XML documents 120, one XML document 120 per user 108/client device 106. It is to be appreciated that the other customized document 120 of the XDMS 112 and the other document 122 of the presence server 102 can represent additional types of XML documents, such as blacklist XML documents, whitelist XML documents, and so on. Accordingly, many of the examples described herein can extend beyond implementations using "pre-rules" by implementing the techniques and systems with the other XML documents 120 and 122 of the XDMS 112 and the presence server 102, respectively. In this manner, the presence server 102 can be controlled by its system configuration 111 to selectively access the XDMS 112 and retrieve the other customized document 120 for use in lieu of its locally-stored XML document 122, or in combination with the locally-stored XML document 122 (e.g., merging two or more XML documents) when processing requests from watchers.

In some implementations, the XDMS 112 may be present in the network environment 100 (as shown in FIG. 1), which is why the "useLocalPresRules" parameter in the system configuration 111 is configurable to be set with different values, such as PRS_NO. When the "useLocalPresRules" parameter is set to the value PRS_NO, the presence server 102 is instructed to engage the XDMS 112 to retrieve pres-rules 114 associated with the presentity client 106(1). In some implementations, the presence server 102 engages the XDMS 112 by attempting a GET Pres-Rules document procedure. In the event that the presence server 102 fails to retrieve the pres-rules 114 from the XDMS 112 (e.g., during an XDMS 112 service interruption), the presence server 102 can fallback to using the locally stored pres-rules 118 to process a request from the watcher client 106(2). This "fallback mechanism" provides consistent availability of the presence information 104, even when there is an XDMS 112 service interruption, or when the presentity client 106(1) fails to explicitly provision customized pres-rules 114 to the XDMS 112 (e.g., when a presentity client 106(1) is not XDMS-capable). A failed retrieval attempt by the presence server 102 may involve receipt at the presence server 102 of an indication that the pres-rules 114 are not retrievable. For example, the presence server 102 may receive a "404 document not found" response, an explicit indication from the XDMS 112 that the pres-rules 114 for a particular presentity were not found, or similar indications.

When the "useLocalPresRules" parameter is set to the value PRS_NO, and the presence server 102 successfully retrieves pres-rules 114 from the XDMS 112, the retrieved pres-rules 114 may be used in lieu of the local pres-rules 118. This allows for advanced presentity clients 106(1) (i.e., client devices 106(1) with advanced RCS functionality) to transmit customized pres-rules 114 to the XDMS 112 upon registering with an IMS network. Thus, the user 108(1) and/or the client device 106(1) can define which watchers can subscribe to the presence information 104 published by the presentity client 106(1), as well as which types of presence information 104 can be made available to authorized watchers. For example, the customized pres-rules 114 provided by the presentity client 106(1) to the XDMS 112 may specify that mood information can be provided only to set of family member users 108, or the user 108(1) can specify personalized icons to be provided to a particular class of watchers or individual watchers. Thus, the implementation that includes the XDMS 112 in the network environment 100 provides for more flexibility in allowing different presence authorization policies to control the sharing of presence information 104, but the pres-rules 118 stored locally at the presence server 102 continue to provide a fallback mechanism in case there is a failure to retrieve the pres-rules 114 from the XDMS 112.

In some implementations, the "useLocalPresRules" parameter can be set to a value of PRS_MERGE. When the "useLocalPresRules" parameter is set to the value PRS_MERGE, the presence server 102 is instructed to engage the XDMS 112 to retrieve the pres-rules 114 associated with the presentity client 106(1). If the presence server 102 fails to successfully retrieve the pres-rules 114 from the XDMS 112, the local pres-rules 118 can be used to process a request from a watcher client 106(2) as a fallback mechanism, just as when the "useLocalPresRules" parameter is set to the value PRS_NO. However, in the event of successful retrieval of the customized pres-rules 114 from the XDMS 112, the PRS_MERGE value causes the presence server 102 to merge the XML document containing the pres-rules 114 with the XML document containing the local pres-rules 118 to create composite pres-rules that contain at least one portion from the pres-rules 118 and at least one portion from the pres-rules 114. The ability to merge authorization policies in this manner allows for further simplification of the client device 106(1) by allowing for some pres-rules 118 that can be globally applied to all users 108 and client devices 106 to be maintained in the local storage 110 of the presence server 102. In this manner, the client devices 106 do not need to send redundant authorization policies to the XDMS 112; a global authorization policy can be maintained by the presence server 102. Furthermore, the merging functionality provides for a more flexible approach to sharing presence information 104 by allowing clients 106 to provide some pres-rules 114 for customized authorization policies in addition to the global authorization policy 112.

In some implementations, the system configuration 111 can include an additional configurable parameter that controls how pres-rules from different sources are merged in the creation of the composite pres-rules described herein. This parameter is referred to as the "compositionPolicyLocalPriority" parameter, and the parameter can be set with the following values: (i) PRS_YES, and (ii) PRS_NO. Again, the names of the parameter and the values are provided merely for illustrative purposes. Accordingly, when the "useLocalPresRules" parameter is set to the value PRS_MERGE, and the "compositionPolicyLocalPriority" parameter is set to the value PRS_YES, the presence server 102 is instructed to merge conflicting portions between the two pres-rules (i.e., pres-rules 118 and pres-rules 114) by keeping the conflicting portions from the locally stored pres-rules 118, and discarding the conflicting portions from the XDMS 112 pres-rules 114. On the other hand, when the "useLocalPresRules" parameter is set to the value PRS_MERGE, and the "compositionPolicyLocalPriority" parameter is set to the value PRS_NO, the presence server 102 is instructed to merge conflicting portions by keeping the conflicting portions from the XDMS 112 pres-rules 114, and discarding the conflicting portions of the locally stored pres-rules 118. In this manner, an authorized service provider can configure the pres-rules 118 at the presence server 102 to control whether conflicting portions of the local pres-rules 118 trump corresponding conflicting portions of the XDMS 112 pres-rules 114, or vice versa, during a merge operation.

Although the network environment 100 of FIG. 1 is described predominantly in the form of an IMS-based network topology, the network environment 100 is not limited to an IMS network, and can represent any type of computer networking framework capable of implementing a presence service for users 108 of the network environment 100. Furthermore, portions of the network environment 100 may be maintained and/or operated by one or more service providers, such as one or more wireless carriers, that provide mobile IMS-based services to their customers (users 108) associated with client devices 106. Such service providers may offer any type of IMS-based services such as services that include, without limitation, MMTel services, emergency services (e.g., E911), gaming services, instant messaging services, presence services, video conferencing services, social networking and sharing services, location-based services, push-to-talk services, and so on. Furthermore, scenarios involving presence services described herein may be implemented in multi-domain or single-domain scenarios, where the watcher client 106(2) and the presentity client 106(1) are subscribed to the same service providing carrier or to different service providing carriers. Accordingly, the network environment 100 is capable of implementing functionality for users 108 of different domains sharing presence information 104 with each other. Moreover, it is to be appreciated that the network environment 100, which may be IMS-based, can include multiple nodes or network entities that are configured for various purposes, such as control and management of multimedia sessions of an IMS core network. FIG. 1 is illustrated, for simplicity reasons, with network entities that may comprise a portion of an overall network environment 100.

Figure 2:
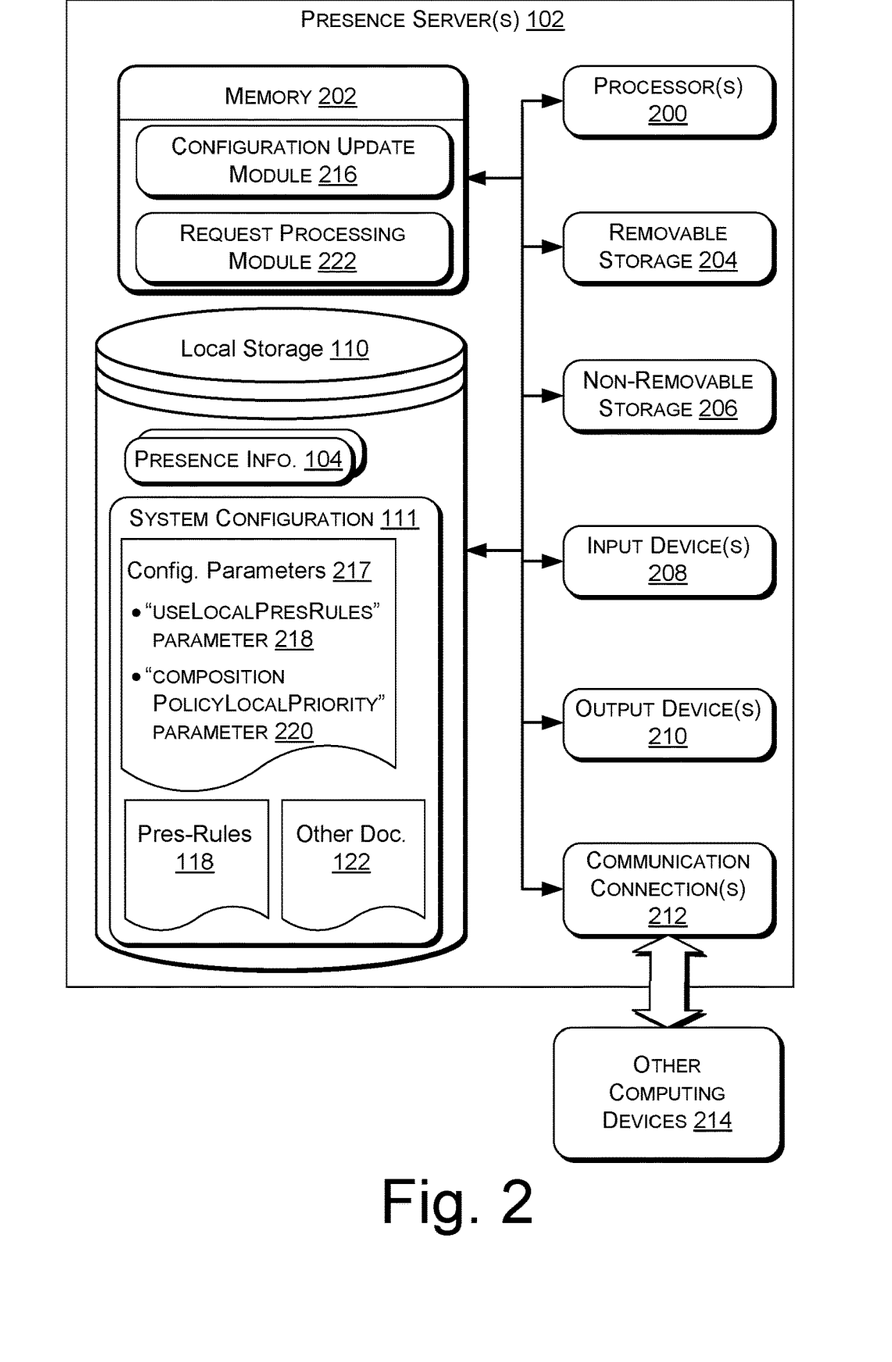
FIG. 2 is a block diagram of an example presence server architecture.

FIG. 2 is a block diagram of an example architecture of the presence server 102 introduced in FIG. 1. As shown, the presence server(s) 102 may include one or more processors 200 and one or more forms of computer-readable memory 202. The presence server 102 may also include additional storage devices. Such additional storage may include removable storage 204, non-removable storage 206, and/or the local storage 110 containing the presence information 104 and the configurable pres-rules 118, as described in FIG. 1.

The presence server 102 may further include input devices 208, including, without limitation, physical buttons (e.g., keyboard or keypad), pointing devices (e.g., mouse, pen, stylus, etc.), or any other suitable input devices 208 coupled communicatively to the processor(s) 200 and the computer-readable memory 202. The presence server 102 may further include output devices 210, including, without limitation, a display, speakers, a printer, or any other suitable output device coupled communicatively to the processor(s) 200 and the computer-readable memory 202.

The presence server 102 may further include communications connection(s) 212 that allow the presence server 102 to communicate with other computing devices 214, such as client devices 106 and/or the XDMS 112 of FIG. 1, via a network. The communications connection(s) 212 may facilitate transmitting and receiving wired and/or wireless signals over any suitable communications/data technology, standard, or protocol, as described herein.

In various implementations, the computer-readable memory 202 is non-transitory and can include both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The non-transitory computer-readable memory 202 may also be described as computer storage media and may include volatile and nonvolatile, removable and non-removable media implemented in any method or technology for storage of information, such as computer readable instructions, data structures, program modules, or other data. Computer-readable memory 202, removable storage 204, non-removable storage 206, and local storage 110 are all examples of non-transitory computer-readable storage media. Non-transitory computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store information accessible to the presence server 102. Any such non-transitory computer-readable media may be part of the presence server 102.

In some implementations, the computer-readable memory 202 may include a configuration update module 216 configured to define or create system configuration 111 maintained in the local storage 110 of the presence server 102, and thereafter update configurable parameters 217 of the system configuration 111. For example, a service provider, using an associated computing device in communication with the presence server 102, may utilize the configuration update module 216 to set values for the configurable parameters 217 in the system configuration 111. The parameter values of the configurable parameters 217 operate to control the behavior of the presence server 102 in determining whether to engage and interrogate a separate storage server, such as an XDMS 112, for retrieval of customized pres-rules 114 maintained by the XDMS 112. In some implementations, the configuration update module 216 may be implemented as a graphical user interface (GUI) that allows an authorized service provider to select values for the configurable parameters 217, and to specify which types of presence information 104 can be provided to which watchers.

FIG. 2 shows a "useLocalPresRules" parameter 218, introduced with FIG. 1, which can be specified in the system configuration 111 and set to values of: (i) PRS_YES, (ii) PRS_NO, or (iii) PRS_MERGE, as described herein. In this manner, the system configuration 111 can be utilized to control the behavior of the presence server 102 via the parameter 218 to either use the locally stored pres-rules 118 as an overriding default authorization policy for processing requests for presence information 104, or interrogate the XDMS 112 to obtain the pres-rules 114 maintained by the XDMS 112 and use the pres-rules 114 in lieu of the locally stored pres-rules 118, or in combination with the pres-rules 118 (e.g., by merging the pres-rules 118 with the pres-rules 114 to create a composite authorization policy). In the event that the "useLocalPresRules" parameter 218 is set to PRS_NO or PRS_MERGE, and the presence server 102 fails to retrieve the pres-rules 114 maintained by the XDMS 112, the locally stored pres-rules 118 can be used as a fallback mechanism to provide presence services to requesting client devices 106.

FIG. 2 also shows a "compositionPolicyLocalPriority" parameter 220, introduced with FIG. 1, which can be set with the values: (i) PRS_YES, and (ii) PRS_NO, as described herein. Accordingly, the presence server 102 can merge conflicting portions between two pres-rules (i.e., pres-rules 118 and pres-rules 114) according to the value of the parameter 220 by either keeping the conflicting portions from the locally stored pres-rules 118, and discarding the conflicting portions of the pres-rules 114 retrieved from the XDMS 112, or vice versa. That is, the parameter 220 can be used to specify which authorization policy (i.e., the pres-rules 118 or the pres-rules 114) trumps the other authorization policy.

The configuration update module 216 of the presence server 102 allows a service provider to quickly and efficiently update the system configuration 111 to implement desired features and functionality related to the sharing of presence information 104 amongst customers of the service provider. For example, the system configuration 111 can be updated with local pres-rules 118 to block the sharing of video calling capabilities with watchers, yet allow the sharing of chat capabilities so that the watchers can discover chat-capable presentity clients. In the current implementation of presence services, such a change would have to go through the XDMS 112 for each presentity client's pres-rules 114, which is a much slower and inefficient process.

In some implementations, the computer-readable memory 202 may include a request processing module 222 configured to process requests for presence information 104 that are received from watcher clients, such as the watcher client 106(2) of FIG. 1. For instance, the request processing module 222 may receive a SIP request from a watcher client 106(2) in the form of a SIP SUBSCRIBE method so that the watcher client 106(2) can subscribe to presence information 104 of the presentity client 106(1). The request processing module 222 may be configured to grant or deny the request based on the appropriate pres-rules. For example, if the parameter 218 is set to a value that instructs the presence server 102 to use the locally stored pres-rules 118 as a default authorization policy for processing requests from watchers, then the pres-rules 118 may be used to grant or deny the request from the watcher client 106(2). If the request is granted, the request processing module 222 may cause the presence server 102 to send a notification including the presence information 104 of the presentity client 106(1) via the communication connection(s) 212 to the requesting client device 106(2). This notification may be transmitted via a SIP NOTIFY method to the watcher client 106(2).

Example Processes

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 3:
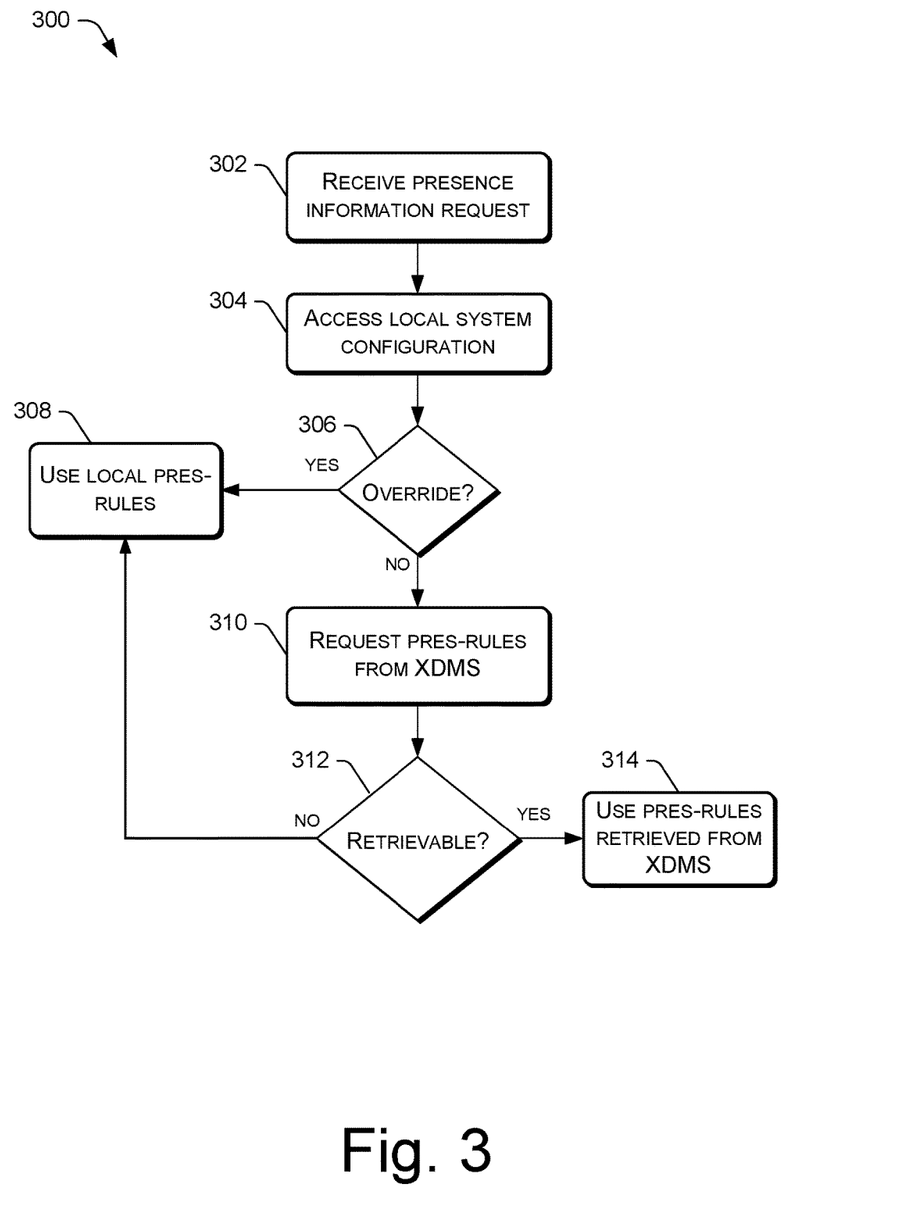
FIG. 3 illustrates a flowchart of an example process for processing a request for presence information using a configurable authorization policy that is maintained in local storage of a presence server.

FIG. 3 illustrates a flowchart of an example process 300 for processing a request for presence information 104 using a system configuration 111 maintained by a presence server 102. The process 300 may be implemented by the presence server 102 and relevant components of the presence server 102.

At 302, the request processing module 222 of the presence server 102 may receive, from a first client device (e.g., the watcher client 106(2)) a request to obtain presence information 104 associated with a second client device (e.g., the presentity client 106(1)). As described herein, the request received at 302 may be in the form of a SIP SUBSCRIBE method received from the client device 106(2) that is requesting presence information 104, such as service capabilities, of the presentity client 106(1). For example, the watcher client 106(2) may want to determine if the presentity client 106(1) is capable of carrying out a video call with the watcher client 106(1), video calling being one type of IMS-based service that the presentity client 106(1) may be capable of utilizing.

At 304, the request processing module 222 of the presence server 102 may access, from the local storage 110 of the presence server 102, the system configuration 111 to determine whether to engage the XDMS 112 or not. The accessing at 304 may comprise retrieving an XML document containing the configurable parameters 217 and parsing the XML document to identify a parameter, such as the parameter 218 of FIG. 2, that dictates the behavior of the presence server 102 in determining whether it is to engage the XDMS 112 or not.

At 306, a determination may be made as to whether the pres-rules 118 maintained in the local storage 110 of the presence server 102 are to be used as a default, overriding authorization policy to process the request received at 302. This determination at 306 may comprise determining the value of the "useLocalPresRules" parameter 218. If the value of the parameter 218 is set to a particular value (e.g., PRS_YES), the process 300 proceeds down the "YES" path to 308 where the request processing module 222 uses the locally stored pres-rules 118 to process the request received at 302. That is, the pres-rules 118 can specify whether the particular watcher client 106(2), or a class of watchers of which the watcher client 106(2) is a member, is authorized to receive the requested presence information 104. In this manner, the presence server 102 may, at operation 308, grant or deny the request received at 302 using the local pres-rules 118 as an overriding, default authorization policy.

If it is determined at 306 that the local pres-rules 118 are not to be used as an overriding, default policy (e.g., the parameter 218 is set to values of PRS_NO or PRS_MERGE), the process 300 proceeds down the "NO" path to 310 where the presence server 102 sends a request to a separate storage server, such as the XDMS 112, for pres-rules 114 associated with the presentity client 106(1) that are maintained by the XDMS 112. The request at 310 may comprise a GET Pres-Rules document request to obtain an XML document that contains customized pres-rules 114 previously sent to the XDMS 112 by the presentity client 106(1).

At 312, a determination is made as to whether the pres-rules 114 are retrievable from the XDMS 112. For example, the presence server 102, in response to attempting retrieval of the pres-rules 114 from the XDMS 112, may receive an indication (e.g., a "404 document not found" response) that the pres-rules 114 are not retrievable. If it is determined at 312 that the pres-rules 114 are not retrievable, the process 300 proceeds along the "NO" path to 308 where the request processing module 222 uses the locally stored pres-rules 118 to process the request received at 302 as a fallback mechanism. This ensures that presence services may be provided to the watcher client 106(2) even in the event of a failure to retrieve pres-rules 114 from the XDMS 112 (e.g., during an XDMS 112 service interruption).

If the pres-rules 114 are successfully retrieved from the XDMS 112 at 312, the process 300 proceeds down the "YES" path to 314 where the request processing module 222 can use the retrieved pres-rules 114 to process the request received at 302. Using the pres-rules 114 at 314 may comprise using the pres-rules 114 in lieu of the pres-rules 118 maintained by the presence server 102, or using the pres-rules 114 in combination with the pres-rules 118 (e.g., merging the pes-rules 118 with the pres-rules 114). In this manner, a presentity client 106(1) can provide customized pres-rules 114 to the XDMS 112 for retrieval and use at 314 if the configurable parameters 217 instruct the presence server 102 to interrogate the XDMS 112 for such customized pres-rules 114.

Figure 4:
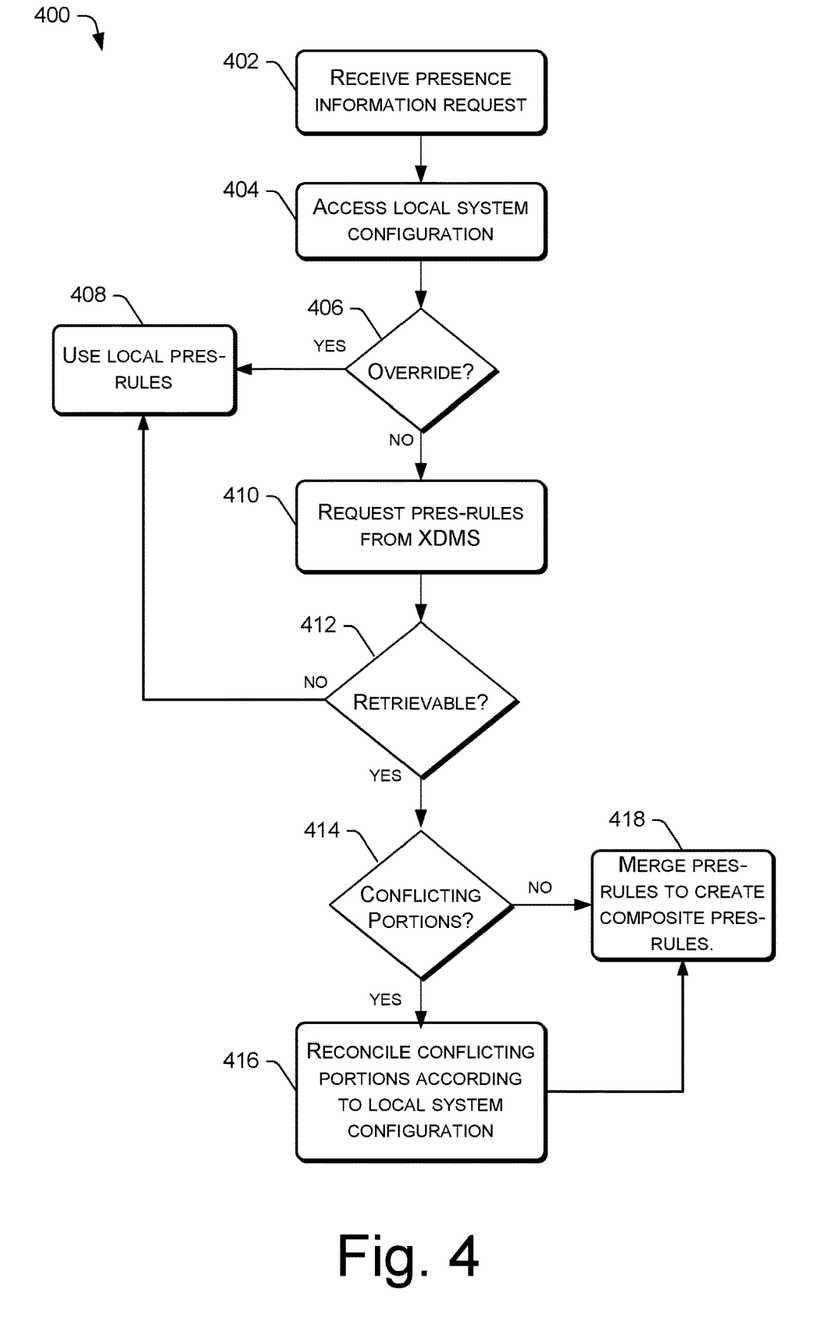
FIG. 4 illustrates a flowchart of an example process for merging local presence authorization rules with presence authorization rules from a different source.

FIG. 4 illustrates a flowchart of an example process 400 for processing a request for presence information 104 by merging local pres-rules (e.g., the pres-rules 118) with pres-rules from a different source (e.g., the pres-rules 114 maintained by the XDMS 112). The process 400 may be implemented by the presence server 102 and relevant components of the presence server 102.

Operations 402 through 412 of the process 400 may be the same as, or similar to, operations 302 through 312 of the process 300, described above. In the example of FIG. 4, the determination at 406 may involve determining that the "useLocalPresRules" parameter 218 is set to the value PRS_MERGE, which causes the request processing module 222 to proceed down the "NO" path to 410, and, if the pres-rules 114 maintained by the XDMS 112 are successfully retrieved at 412, the process 400 proceeds down the "YES" path from 412 to 414.

At 414, a determination may be made as to whether the customized pres-rules 114 retrieved from the XDMS 112 have one or more portions that conflict with portions of the locally stored pres-rules 118 maintained by the presence server 102. If, at 414, at least one conflicting portion is identified between the two sets of pres-rules (i.e., the pres-rules 114 and the pres-rules 118), the process 400 may proceed down the "YES" path to 416 where the conflicting portion(s) are reconciled. Reconciliation of conflicting portions may comprise keeping the conflicting portion from one of the two pres-rules, and discarding the conflicting portion in the other pres-rules. In some implementations, the request processing module 222 may parse an XML document containing the configurable parameters 217 to identify the "compositionPolicyLocalPriority" parameter 220 and may determine that the parameter 220 is set to the value PRS_YES. In this case, the conflicting portion of the locally stored pres-rules 118 may be kept, and the conflicting portion of the XDMS 112 pres-rules 114 can be discarded in the creation of composite pres-rules at 418. If, on the other hand, the parameter 220 is set to a value of PRS_NO, the conflicting portion of the XDMS 112 pres-rules 114 may be kept, and the conflicting portion of the locally stored pres-rules 118 may be discarded in the creation of the composite pres-rules at 418.

In the event that there are no conflicting portions identified at 414, the process 400 may proceed down the "NO" path to 418 to create composite pres-rules by merging the pres-rules 118 with the pres-rules 114. In this scenario, there is no need to reconcile conflicting portions at 416 when there are no conflicting portions to be reconciled.

Figure 5:
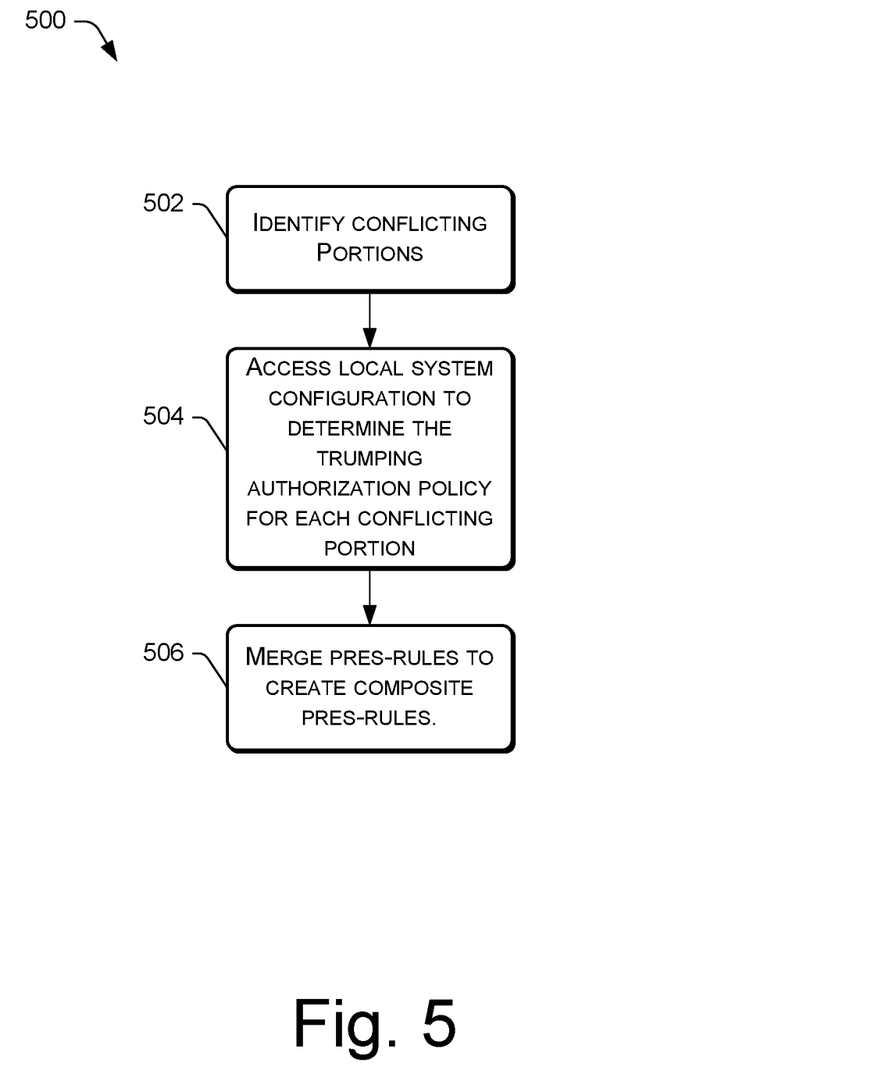
FIG. 5 illustrates a flowchart of an example process for merging different presence authorization rules having multiple conflicting portions.

FIG. 5 illustrates a flowchart of an example process 500 for merging pres-rules having multiple conflicting portions. The process 500 may represent a sub-process of operation 416 of the process 400 where conflicting portions of two different pres-rules are reconciled. The process 500 may be implemented by the presence server 102 and relevant components of the presence server 102.

At 502, after retrieving the pres-rules 114 from the XDMS 112, the presence server 102 may identify conflicting portions between the XDMS 112 pres-rules 114 and the pres-rules 118 maintained by the presence server 102. The identification of conflicting portions may be based on semantic similarities determined using natural language processing or other types of text analysis of the pres-rules 118 and the pres-rules 114.

At 504, the request processing module 222 of the presence server 102 may access the system configuration 111 to determine how to reconcile multiple conflicting portions identified at 502. For example, depending on the type of conflicting information in the two pres-rules, one of the pres-rules may "trump" (i.e., override) the other pres-rules, and vice versa. In some implementations, a configurable parameter may be specified in the system configuration 111 for a particular type of presence information 104 or a particular class of watchers so that if there is a conflict between the two pres-rules to be merged with respect to the particular type of presence information 104 or the particular class of watchers, the value of the configurable parameter dictates whether the presence server 102 is to use the conflicting portion from the pres-rules 118 or use the conflicting portion from the pres-rules 114 in the creation of composite pres-rules. For example, if the pres-rules 114 retrieved from the XDMS 112 specify that the watcher client 106(2) of FIG. 1 should be blocked from the requested presence information 104, while the pres-rules 118 specify that the watcher client 106(2) is authorized to receive the requested presence information 104, these respective portions of the two sets of pres-rules may be deemed as conflicting portions. The configurable parameters 217 may include an additional parameter for the class of watchers including the watcher client 106(2) that is set to a value indicating that the pres-rules 118 trump the pres-rules 114, which results in creating composite pres-rules that authorize the watcher client 106(2).

As another example, the pres-rules 114 may authorize the sharing of mood information of the user 108(1), while the pres-rules 118 do not authorize sharing the mood information of the user 108(1). In this example, a configurable parameter associated with mood information may be included in the configurable parameters 217 and may be set to a value that instructs the presence server 102 to use the conflicting portion relating to the sharing of mood information from the pres-rules 114 in lieu of the corresponding conflicting portion from the pres-rules 118. Discarding the conflicting portion from the pres-rules 118 and using the conflicting portion from the pres-rules 114 results in the creation of composite pres-rules that authorize the sharing of mood information of the user 108(1) with the watcher client 106(2).

At 506, the composite pres-rules may be created by using at least one portion from each of the two sets of pres-rules (i.e., the pres-rules 118 and the pres-rules 114) in the composite pres-rules. That is, the pres-rules 114 may trump the pres-rules 118 for some conflicting portions while the pres-rules 118 may trump the pres-rules 114 for other conflicting portions. In this manner, the process 500 allows for more flexible merging of two different pres-rules XML documents to create composite pres-rules for use in processing requests from watchers.

As noted above, although the processes 300, 400, and 500 are described with reference to using (and sometimes merging) pres-rules, the processes 300, 400, and 500 can be used with the other types of XML documents 120 and 122 discussed with reference to FIG. 1, above. For example, the process 300 can be utilized to determine if the presence server 102 is to attempt retrieval of a resource-list XML document 120 from the XDMS 112, and/or when to use a local resource-list XML document 122 as an overriding default, or as a fallback mechanism, at 308. In this sense, the techniques and systems described herein are not limited to implementation with pres-rules.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. A computer-implemented method comprising:
   receiving, at a presence server and from a first client device, a request to obtain presence information associated with a second client device;
   accessing, from memory of the presence server storing first presence authorization rules, a system configuration document containing configurable parameters;
   identifying a parameter of the configurable parameters, wherein the parameter is set to one of multiple possible values, the multiple possible values including a first value for using the first presence authorization rules to be retrieved from the memory of the presence server, a second value for using second presence authorization rules to be retrieved from a storage server, and a third value for merging the first presence authorization rules with the second presence authorization rules;
   sending, in response to determining that the parameter is set to the second value, a request to the storage server for the second presence authorization rules associated with the second client device;
   determining that the second presence authorization rules are not retrievable from the storage server; and
   processing, at least partly in response to determining that the second presence authorization rules are not retrievable, the request received from the first client device using the first presence authorization rules.

2. The computer-implemented method of claim 1, wherein the storage server comprises an eXtensible Markup Language (XML) Document Management Server (XDMS).

3. The computer-implemented method of claim 1, wherein accessing the system configuration document comprises accessing an eXtensible Markup Language (XML) document containing the configurable parameters.

4. The computer-implemented method of claim 3, further comprising:
   parsing the XML document to identify the parameter.

5. The computer-implemented method of claim 1, wherein processing the request received from the first client device comprises granting the request to obtain the presence information associated with the second client device, the method further comprising: accessing, from the memory of the presence server, the presence information associated with the second client device; and sending a notification to the first client device comprising the presence information associated with the second client device.

6. The computer-implemented method of claim 1, wherein the presence information comprises a capability of the second client device for performing an Internet Protocol Multimedia Subsystem (IMS)-based service.

7. The computer-implemented method of claim 1, wherein the first client device is a watcher client and the second client device is a presentity client.

8. A computer-implemented method comprising:
receiving, at a presence server and from a first client device, a request to obtain presence information associated with a second client device;
accessing, from memory of the presence server, an eXtensible Markup Language (XML) document containing configurable parameters;
identifying a parameter of the configurable parameters in the XML document, wherein the parameter is set to one of multiple possible values, the multiple possible values including a first value for using first presence authorization rules to be retrieved from the memory of the presence server, a second value for using second presence authorization rules to be retrieved from a storage server, and a third value for merging the first presence authorization rules with the second presence authorization rules;
determining that the parameter is set to the first value of the multiple possible values; and
processing, in response to determining that the parameter is set to the first value, the request received from the first client device using the first presence authorization rules retrieved from the memory of the presence server.

9. The computer-implemented method of claim 8, wherein processing the request received from the first client device comprises granting the request to obtain the presence information associated with the second client device, the method further comprising: accessing, from the memory of the presence server, the presence information associated with the second client device; and sending a notification to the first client device comprising the presence information associated with the second client device.

10. The computer-implemented method of claim 8, wherein the presence information comprises a capability of the second client device for performing an Internet Protocol Multimedia Subsystem (IMS)-based service.

11. The computer-implemented method of claim 8, wherein the first client device is a watcher client and the second client device is a presentity client.

12. A presence server comprising:
a processor; and
memory storing instructions that, when executed by the processor, perform acts comprising:
receiving at the presence server and from a first client device, a request to obtain presence information associated with a second client device;
accessing, from the memory of the presence server storing first presence authorization rules, a system configuration document containing configurable parameters;
identifying a parameter of the configurable parameters, wherein the parameter is set to one of multiple possible values, the multiple possible values including a first value for using the first presence authorization rules to be retrieved from the memory of the presence server, a second value for using second presence authorization rules to be retrieved from a storage server, and a third value for merging the first presence authorization rules with the second presence authorization rules;
sending, in response to determining that the parameter is set to the third value, a request to the storage server for the second presence authorization rules associated with the second client device;
receiving the second presence authorization rules from the storage server;
merging the second presence authorization rules with the first presence authorization rules to create composite presence authorization rules; and
processing the request received from the first client device using the composite presence authorization rules.

13. The presence server of claim 12, wherein the storage server comprises an eXtensible Markup Language (XML) Document Management Server (XDMS).

14. The presence server of claim 12, wherein accessing the system configuration document comprises accessing an eXtensible Markup Language (XML) document containing the configurable parameters.

15. The presence server of claim 14, the acts further comprising:
parsing the XML document to identify the parameter.

16. The presence server of claim 12, wherein processing the request received from the first client device comprises granting the request to obtain the presence information associated with the second client device, the acts further comprising: accessing, from the memory of the presence server, the presence information associated with the second client device; and sending a notification to the first client device comprising the presence information associated with the second client device.

17. The presence server of claim 12, the acts further comprising, after receiving the second presence authorization rules from the storage server:
determining that at least a portion of the first presence authorization rules conflicts with a portion of the second presence authorization rules;
identifying a second parameter of the configurable parameters in the system configuration document;
determining that the second parameter is set to a first value of multiple second possible values; and
creating the composite presence authorization rules with the portion of the first presence authorization rules in lieu of the portion of the second presence authorization rules.

18. The presence server of claim 12, the acts further comprising, after receiving the second presence authorization rules from the storage server:
determining that at least a portion of the first presence authorization rules conflicts with a portion of the second presence authorization rules;
identifying a second parameter of the configurable parameters in the system configuration document;
determining that the second parameter is set to a first value of multiple second possible values; and
creating the composite presence authorization rules with the portion of the second presence authorization rules in lieu of the portion of the first presence authorization rules.

19. The presence server of claim 12, the acts further comprising, after receiving the second presence authorization rules from the storage server:
- determining that multiple portions of the first presence authorization rules conflict with multiple portions of the second presence authorization rules;
- accessing the system configuration document to determine a merging policy; and
- based on the merging policy, creating the composite presence authorization rules by:
  - including a first portion of the multiple portions of the first presence authorization rules in the composite presence authorization rules in lieu of a first portion of the multiple portions of the second presence authorization rules; and
  - including a second portion of the multiple portions of the second presence authorization rules in the composite presence authorization rules in lieu of a second portion of the multiple portions of the first presence authorization rules.

20. The presence server of claim 12, wherein the presence information comprises a capability of the second client device for performing an Internet Protocol Multimedia Subsystem (IMS)-based service.

* * * * *